(12) United States Patent
Niyazov et al.

(10) Patent No.: US 11,922,357 B2
(45) Date of Patent: Mar. 5, 2024

(54) SYSTEM AND METHOD FOR IDENTIFYING AND HANDLING DATA QUALITY ANOMALIES

(71) Applicant: Charter Communications Operating, LLC, St. Louis, MO (US)

(72) Inventors: Irina Niyazov, Commack, NY (US); Jayanta Sengupta, Charlotte, NC (US); Michael Bender, Rye Brook, NY (US)

(73) Assignee: Charter Communications Operating, LLC, St. Louis, MO (US)

( * ) Notice: Subject to any disclaimer, the term of this patent is extended or adjusted under 35 U.S.C. 154(b) by 141 days.

(21) Appl. No.: 17/496,697

(22) Filed: Oct. 7, 2021

(65) Prior Publication Data

US 2023/0111216 A1  Apr. 13, 2023

(51) Int. Cl.
| | |
|---|---|
| *G06Q 10/00* | (2023.01) |
| *G06Q 10/0637* | (2023.01) |
| *G06Q 10/0639* | (2023.01) |
| *H04L 43/16* | (2022.01) |

(52) U.S. Cl.
CPC .... *G06Q 10/06395* (2013.01); *G06Q 10/06375* (2013.01); *H04L 43/16* (2013.01)

(58) Field of Classification Search
None
See application file for complete search history.

(56) References Cited

U.S. PATENT DOCUMENTS

| | | |
|---|---|---|
| 7,281,001 B2 | 10/2007 | Caulfield et al. |
| 8,887,286 B2 | 11/2014 | Dupont et al. |
| 9,639,521 B2 | 5/2017 | Seow et al. |
| 10,909,152 B2 | 2/2021 | Canim et al. |
| 2006/0136461 A1 | 6/2006 | Lee et al. |
| 2013/0055042 A1* | 2/2013 | Al Za'noun ..... G06Q 10/06395 714/E11.023 |
| 2015/0365309 A1* | 12/2015 | Kaminski ............... H04L 47/83 709/224 |
| 2016/0253614 A1* | 9/2016 | Miller .............. G06Q 10/06395 705/7.41 |
| 2017/0102694 A1* | 4/2017 | Enver .............. G06Q 10/06395 |
| 2017/0230211 A1* | 8/2017 | Teflian ................... H04B 15/00 |

(Continued)

FOREIGN PATENT DOCUMENTS

EP  3 276 913 A1  1/2018

OTHER PUBLICATIONS

Flovik, Vegard, How to use machine learning for anomaly detection and condition monitoring, Dec. 31, 2018, Towards Data Science, https://towardsdatascience.com/how-to-use-machine-learning-for-anomaly-detection-and-condition-monitoring-6742f82900d7, p. 1-16. (Year: 2018).*

*Primary Examiner* — Joseph M Waesco (74) *Attorney, Agent, or Firm* — THE MARBURY LAW GROUP, PLLC (57) ABSTRACT

Systems, methods, devices, and non-transitory media of the various embodiments may provide for managing data quality anomalies in an enterprise system. Various embodiments may enable one or more network computing device to identify control points for monitoring data sets in the enterprise system, track data quality metrics using at least one threshold for each of the identified control points, determine whether a data quality anomaly is detected, and classify a review priority in response to determining that a data quality anomaly is detected.

26 Claims, 5 Drawing Sheets

(56) References Cited

U.S. PATENT DOCUMENTS

| | | | |
|---|---|---|---|
| 2017/0279832 A1* | 9/2017 | Di Pietro | H04L 63/1458 |
| 2017/0279838 A1* | 9/2017 | Dasgupta | H04L 63/1425 |
| 2017/0335665 A1* | 11/2017 | Saleri | G06Q 10/0637 |
| 2018/0316707 A1* | 11/2018 | Dodson | H04L 43/16 |
| 2019/0052575 A1* | 2/2019 | Kaminski | H04L 47/83 |
| 2019/0108471 A1* | 4/2019 | Widanapathirana | G06Q 10/063114 |
| 2019/0369607 A1* | 12/2019 | Enver | G05B 19/0428 |
| 2019/0385100 A1* | 12/2019 | Zaman | G06F 17/16 |
| 2020/0076677 A1* | 3/2020 | Mermoud | H04L 41/0631 |
| 2020/0334596 A1* | 10/2020 | Ramaswamy | G06Q 10/0633 |
| 2021/0037037 A1* | 2/2021 | Oliner | H04L 63/1425 |
| 2021/0103580 A1* | 4/2021 | Schierz | G06F 16/2365 |
| 2021/0176115 A1* | 6/2021 | Thampy | H04L 43/067 |
| 2021/0226867 A1* | 7/2021 | Ovadia | H04L 43/065 |
| 2022/0114593 A1* | 4/2022 | Johnson | G06F 18/24133 |
| 2022/0231903 A1* | 7/2022 | Thampy | H04L 43/067 |
| 2022/0269908 A1* | 8/2022 | Batoukov | G06F 11/0781 |
| 2022/0318118 A1* | 10/2022 | Adamson | G06F 11/3419 |

\* cited by examiner

SYSTEM AND METHOD FOR IDENTIFYING AND HANDLING DATA QUALITY ANOMALIES

BACKGROUND

The ability of an organization to rely on data to make business decisions is directly related to the quality of the data. Specifically, business intelligence solutions are only effective if the input data or information is trustworthy.

In current business intelligence solutions, the volume of the data makes it difficult to identify data quality issues, and once identified, to prioritize fixing certain problems over others.

Existing data quality platforms that have been implemented for businesses are able to determine whether an ingested data set meets certain criteria and/or expectations that are set by technology teams and/or other departments. However, current solutions have not provided the ability to integrate data sets from different departments and/or networks within an enterprise system while ensuring that the data does not lose integrity. Further, current solutions do not provide methods for evaluating business rules integrated from various data sources for the enterprise system, while maintaining high levels of accuracy and usability for the collected data.

Business intelligence teams that monitor data being ingested from various sources into the enterprise system strive to ensure data is of good quality, which may include ensuring that data has appropriate levels of granularity, integrity, and expected growth, as well as ensuring that business rules implemented are serving the desired functions.

SUMMARY

The systems, methods, devices, and non-transitory media of the various embodiments may provide for managing data quality anomalies in an enterprise system. Various embodiments may include identifying control points for monitoring data sets in the enterprise system, tracking data quality metrics using at least one threshold for each of the identified control points, determining whether a data quality anomaly is detected, and classifying a review priority in response to determining that a data quality anomaly is detected.

In various embodiments, classifying a review priority may include identifying a business impact of the detected data quality anomaly. Various embodiments may further include adjusting the identified business impact of the detected data quality anomaly. In some embodiments, adjusting the identified business impact may be based on a degree of deviation from the at least one threshold for an identified control point associated with the detected data quality anomaly.

Various embodiments may further include automatically adjusting the at least one threshold for an identified control point associated with the detected data quality anomaly. In various embodiments, automatically adjusting the at least one threshold may be based at least in part on historical false positive alerts for the identified control point associated with the detected data quality anomaly.

In various embodiments, automatically adjusting the at least one threshold may include lowering the at least one threshold to capture additional problems impacting business. In some embodiments, the additional problems may be identified by analysis of feedback for the identified control point associated with the detected data quality anomaly.

Various embodiments may further include performing a multi-dimensional analysis on the detected data quality anomaly in response to determining that a data quality anomaly is detected.

In various embodiments, performing a multi-dimensional analysis on the detected data quality anomaly may be based on a risk tier assigned to the detected data quality anomaly, a recency score assigned to the detected data quality anomaly, and a frequency score assigned to the detected data quality anomaly. In various embodiments, the frequency score may be based at least in part on historical trends in anomalies for an identified control point associated with the detected data quality anomaly. In various embodiments, the recency score may be based at least in part on temporal proximity of historical anomalies for an identified control point associated with the detected data quality anomaly. In some embodiments, the risk tier may be based at least in part on cognitive analysis of feedback responding to historical anomalies for an identified control point associated with the detected data quality anomaly.

In various embodiments, classifying the review priority may further include analyzing a historical impact of adjusting thresholds for an identified control point associated with the detected data quality anomaly. Various embodiments may further include determining a cost associated with the detected data quality anomaly in response to determining that a data quality anomaly is detected.

Various embodiments may further include determining whether and how the detected data quality anomaly should be resolved based at least in part on the review priority in response to determining that a data quality anomaly is detected.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

Various aspects further include a network computing device having a processor configured with processor executable instructions to perform operations of any of the methods summarized above. Various aspects further include a network processing device for use in a computing device and configured to perform operations of any of the methods summarized above. Various aspects include a network computing device having means for performing functions of any of the methods summarized above. Various aspects include a non-transitory processor-readable storage medium having stored thereon processor-executable instructions configured to cause a processor of a network computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

The various embodiments provide systems and methods for identifying data quality problems by initially identifying the impact to underlying business processes of an anomaly using detection thresholds for various metrics, and historical patterns. Once identified, the embodiment systems may classify a data quality anomaly based on frequency, temporal proximity, and risk tier/severity.

Further, the embodiment systems and methods may track the historical resolution of data quality anomalies for similar problems while also adjusting the detection thresholds based on analysis of the life cycle tracking for the problem. In various embodiments, such tracking may include status changes as well as natural language processing (NLP) of the interactive textual discussions related to the problem. In various embodiments, analysis using all of this data and metadata will allow for recommendations on prioritization of the problem, whether resolution is needed, and what steps are to be taken in order to resolve the problem.

In particular, the various embodiments provide computer enabled system and method to track and prioritize data anomalies based on multi-dimensional analysis combined with natural language processing of discussions around identified problems.

Systems according to the various embodiments may also analyze data in order to supplement the data quality processes by identifying business problems that were not caught by the existing processes (e.g., due to insufficient coverage, too large of a threshold, etc.).

In some embodiments, a business platform for data quality may intelligently update detection of data quality anomalies in an environment where thresholds for various metrics are being modified/updated, either based on a change in underlying processors or information, or on routine scheduling (e.g., a holiday, weekend, etc.). Further, the platform may enable intelligent building of rules management by allowing various rules to be automatically applied to new data sets.

The use of dynamic changes to detection thresholds to identify data quality anomalies, and natural language processing to identify the impact of data quality problems, provide improvements over currently available solutions.

Figure 1:
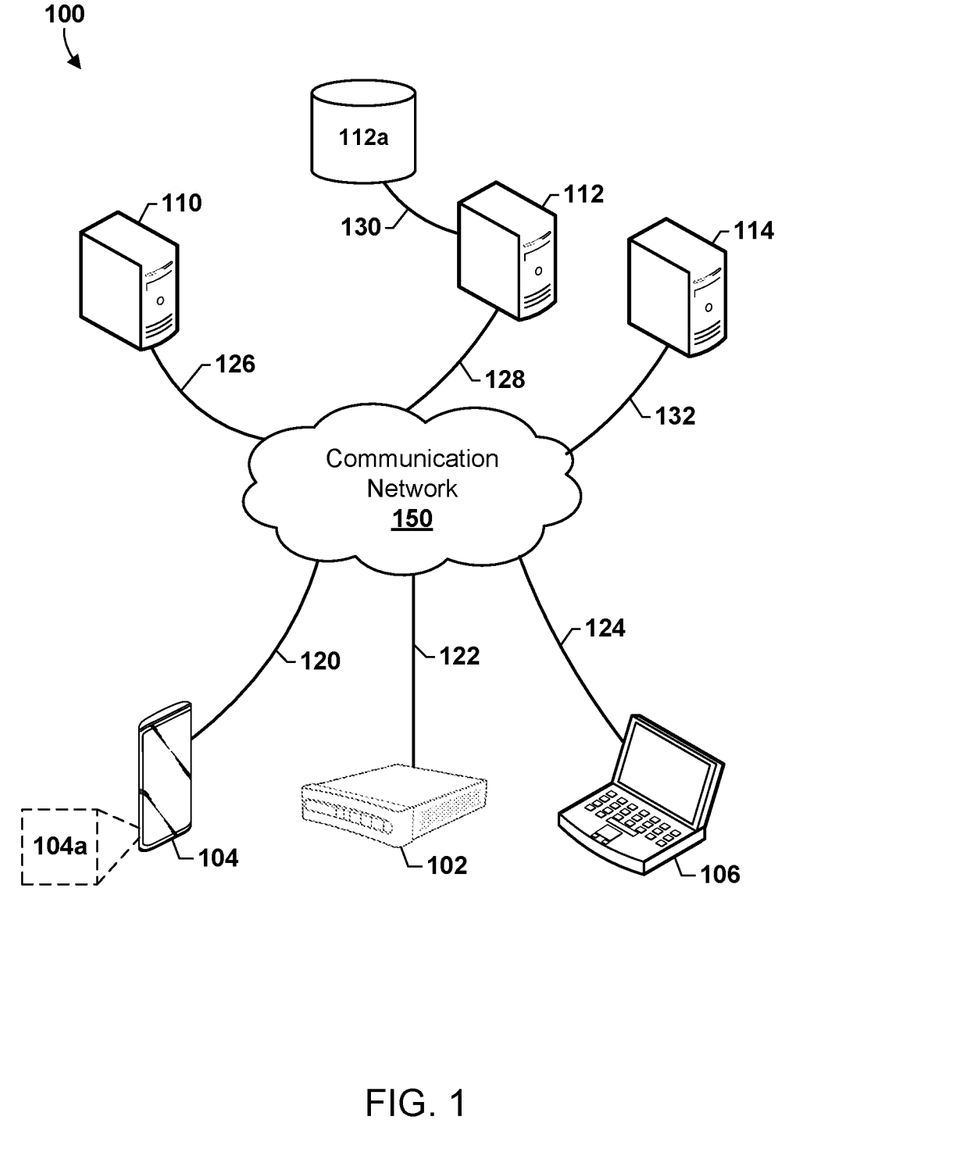
FIG. 1 is a system block diagram of a communication system according to various embodiments.

Various embodiments may be implemented within enterprise software used to manage a variety of communication systems 100, an example of which is illustrated in FIG. 1.

With reference to FIG. 1, the communication system 100 may include various user equipment (UE) such as a set top box (STB) 102, a mobile device 104, a computer 106. In addition, the communication system 100 may include network elements such as network computing devices 110, 112, and 114, and a communication network 150. In various embodiments, the network computing devices 110, 112, 114 may be part of an enterprise system. The STB 102, the mobile device 104, the computer 106, and the network computing devices 110, 112, and 114 may communicate with the communication network 150 via a respective wired or wireless communication link 120, 122, 124, 126, 128 and 132. The network computing device 112 may communicate with a data store 112a via a wired or wireless communication link 130.

The STB 102 may include customer premises equipment, which may be implemented as a set top box, a router, a modem, or another suitable device configured to provide functions of an STB. The mobile device 104 may include any of a variety of portable computing platforms and communication platforms, such as cell phones, smart phones, Internet access devices, and the like. The computer 106 may include any of a variety of personal computers, desktop computers, laptop computers, and the like.

The network computing device 110 may be configured to perform operations related to management of computing resources. Such computing resources may be provided, for example, by the network computing devices 112 and 114. In some embodiments, execution of a task or service may require data or information stored in the data store 112a.

The STB 102, the mobile device 104, and the computer 106 may each include a processor or processing device that may execute one or more client applications (e.g., client application 104a). The client application 104a may send (via the mobile device 104) a call to the network computing device 114. The call may include a request for information from, for example, a target system executing on, or available through, the network computing device 112.

The communication network 150 may support wired and/or wireless communication among the STB 102, the mobile device 104, the computer 106, and the network computing devices 110, 112, and 114. The communication network 150 may include one or more additional network elements, such as servers and other similar devices (not illustrated). The communication system 100 may include additional network elements to facilitate communication among the STB 102, the mobile device 104, the computer 106, and the network computing devices 110, 112, and 114. The communication links 120, 122, 124, 126, 128, 130 and 132 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 120, 122, 124, 126, 128, 130 and 132 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, 126, 128, 130 and 132 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless.

Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
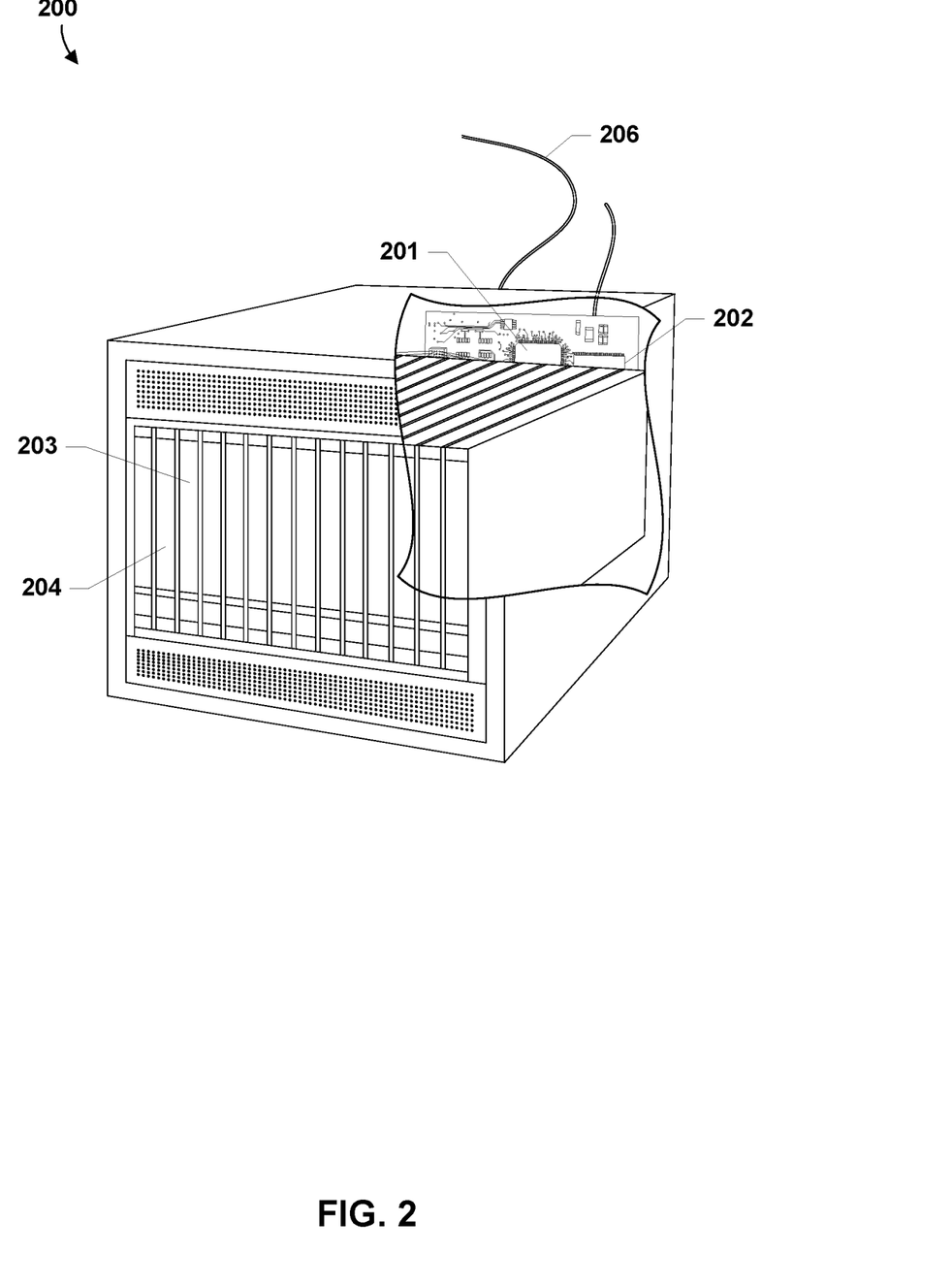
FIG. 2 is a system block diagram illustrating components of a network element suitable for implementing various embodiments.

Various embodiments may use a computing device as a server, router, or another suitable element of a communication network. Such network elements may typically include at least the components illustrated in FIG. 2, which illustrates an example network computing device 200. With reference to FIGS. 1 and 2, the network computing device 200 (e.g., the computing devices 110, 112, and 114) may include a processor 201 coupled to volatile memory 202 and a large capacity nonvolatile memory, such as a disk drive 203. The network computing device 200 may also include a peripheral memory access device such as a floppy disc drive, compact disc (CD) or digital video disc (DVD) drive 204 coupled to the processor 201. The network computing device 200 may also include network access ports 206 (or interfaces) coupled to the processor 201 for establishing data connections with a network, such as the Internet and/or a local area network coupled to other system computers, servers, or components in a service provider network. Similarly, the network computing device 200 may include additional access ports, such as USB, Firewire, Thunderbolt, and the like for coupling to peripherals, external memory, or other devices.

The systems and methods according to various embodiments may be provided through software modules installed on a single computing device, or on multiple computing devices. The embodiment processes may provide a complete picture view of data that is being collected and transformed into information flows for an enterprise system, providing the ability to fill in data gaps or identify suspected corruption of data sets.

For example, data may be incomplete or corrupted as a result of upstream failures in data collection, such as a call center server being down and failing to collect and report the expected level of call data. As another example, data may be incomplete or corrupted as a result of changing processes in one area or department of the system that has an unexpected impact to analytics in another area or department.

As another example, data may be incomplete or corrupted based on a system update (e.g., modem firmware) that does not refresh or include previously-automated reporting processes for certain analytics. In a further example, data may be incomplete or corrupted based on events that occur outside of the control of the system or enterprise (e.g., service line or network equipment damaged or offline, weather events, etc.).

Figure 3:
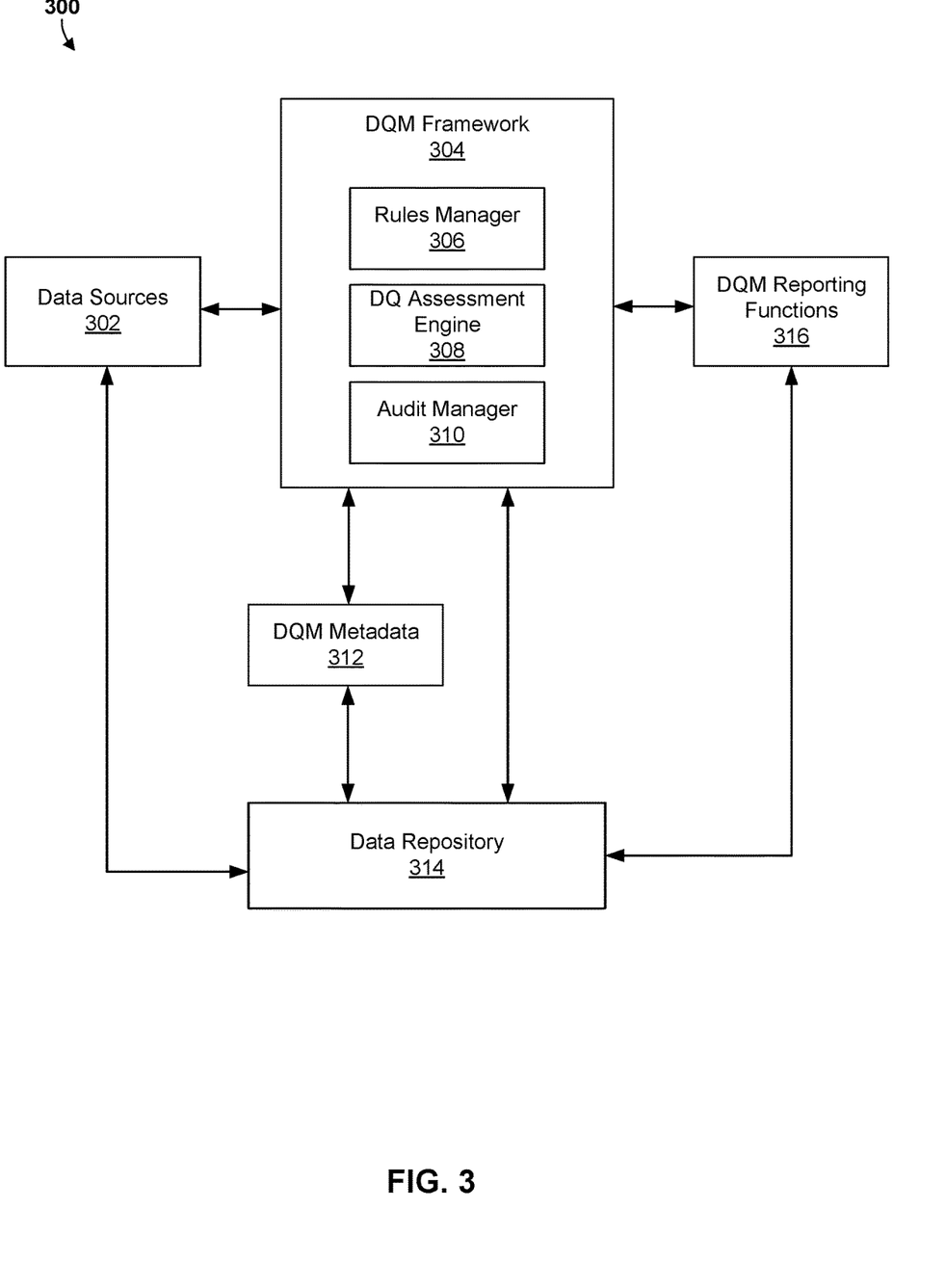
FIG. 3 is a component block diagram illustrating components of a data testing integrity architecture suitable for implementing various embodiments.

FIG. 3 is a block diagram illustrating data integrity testing architecture 300 suitable for implementing various embodiments. With reference to FIGS. 1-3, the data integrity testing architecture 300 may include various data sources 302, which may be internal (e.g., data from different departments, automated systems, etc.) and/or external (e.g., from contractors, direct customer interactions, etc.). The architecture 300 may also include data quality management (DQM) framework 304, that may be implemented in one or more processors of one or more computing devices of the enterprise system (e.g., the computing devices 110, 112, 114, 200). In various embodiments, the DQM framework 304 may be implemented in software, hardware, or a combination of software and hardware.

In various embodiments, the data sources 302 may deliver data to an enterprise system through data interfaces (e.g., secure socket layers (SSLs), via virtual private networks (VPNs), HTTPs, or through other connections). Such data may include, for example, various forms of reporting for the enterprise network, including event logs, system logs, application logs, database logs, threat software data, operational intelligence, machine data that includes records of the activity and behavior of network customers and users, as well as activity and behavior records of transactions, applications, servers, networks and mobile devices on the network. As additional examples, the data from the data sources 302 may include data relating to machine configurations, web access logs, operating system events, message queues, change events, diagnostic command output, transaction records such as call detail records, and sensor data.

In various embodiments data ingestion circuitry implemented by the enterprise system may accept the connections to receive the data for analysis. Such circuitry may include, for example, communication interfaces (e.g., Ethernet ports, WiFi interfaces) and/or receivers adapted for communication with the data sources 302 (e.g. SSL receivers, VPN receivers, etc.).

In various embodiments, certain data from the data sources 302 may be expressed in a textual form that follows natural language semantics. In some embodiments, one or more module of the DQM framework 304 may execute natural language processing (NLP) tasks on ingested data text and voice from the data sources 302. Such tasks may include, for example, speech recognition for reliably converting voice data into text, grammatical tagging for determining the part of speech of a particular word or piece of text based on use and context, and word-sense disambiguation to select the appropriate meaning of a word through semantic analysis.

NLP tasks may also include, for example, terminology extraction to automatically pick up relevant terms, entity linking to identify a named-entity in context, and co-reference resolution to identify multiple words referring to the same entity (e.g., anaphora resolution to match pronouns with nouns).

NLP tasks may also include, for example, relationship extraction to identify the relationships among named entities, and discourse analysis to re-identify the discourse structure of connected text. NLP tasks may further include, for example, topic segmentation/recognition to separate text into segments that are devoted to different topics, sentiment analysis to extract subjective qualities (e.g., attitudes, emotions, confusion, sarcasm, etc.) from text, argument mining to automatically extract and identify argumentative structures from natural language text, and others.

Various NLP tools and approaches that are presently availability and may be implemented in the enterprise system include Python programing and Natural Language Toolkit (NLTK), which includes libraries for many of the NLP tasks and subtasks. Such subtasks may include, for example, sentence parsing, word segmentation, stemming and lemmatization, and tokenization for phrases, sentences, paragraphs and passages. The NLTK further includes libraries for implementing capabilities such as semantic reasoning, the ability to reach logical conclusions based on facts extracted from text.

Another NLP approach that may be employed is statistical NLP, which combines computer algorithms with machine learning and deep learning models to automatically extract, classify, and label elements of text and voice data, and assign a statistical likelihood to each possible meaning of those elements. In various embodiments, deep learning models may be based on convolutional neural networks (CNNs) and recurrent neural networks (RNNs) to enable machine learning from use of NLP tools over time. In this manner, a computing system implementing NLP may extract more accurate meaning from volumes of raw, unstructured, and unlabeled text and voice data sets.

In various embodiments, the DQM framework 304 may include a plurality of modules, which may be separately configured and deployed. For example, a rules manager 306, a data quality (DQ) assessment engine 308, and an audit manager 310. In various embodiments, the modules of the DQM framework 304 may be independently reusable. That is, such modules may be repackaged for use in systems outside of business intelligence.

The data and processes of the modules in the DQM framework may be associated with DQM metadata 312. In various embodiments, the DQM metadata 312 may include audit metadata describing the audit manager processes, the data quality scores, the rules manager, and other processes or components. The data and processes of the modules in the DQM framework 304 and the DQM metadata 312 may also be associated with a database layer 314. In various embodiments, the data repository 314 may store information from the DQ assessment engine 308 and the rules manager 306. For example, such information may include details about each data integration or data exception that occurs, including the data, the tier level, and the identification or description of a specific issue. In various embodiments, the audit manager 310 may run statistical functions on the information stored in the data repository 314 to identify which are the most critical issues to address for the business intelligence group, as discussed in further detail below.

The data integrity testing architecture 300 may also include various data quality management (DQM) reporting functions 316 that operate to distribute results from the audit manager 310. In some embodiments, the DQM reporting functions 316 may include email, messaging, analytics reporting software, and/or other output formats. In some embodiments, the DQM reporting functions 316 may be implemented by interface generation circuitry on one or more computing device in the enterprise system. Such interface generation circuitry may render and deliver system interfaces to any endpoint, such as web portals, smartphone applications, or proprietary enterprise review and control systems.

Examples of system interfaces include network metrics reporting graphical user interfaces (GUIs) 122, alert GUIs, and analysis GUIs. IN some embodiments, the system interfaces may be available through application servers that communicate network (e.g., web browser), mobile, or other types of interfaces to connected computers or smartphone clients. In some embodiments, the system interfaces may be available through a dashboard interface system in a secure location within the enterprise that renders security dashboards including metrics, alerts, analysis interfaces, or other interface elements.

The platform of various embodiments may evaluate the level of importance that each anomaly data point has to an overall business system. In particular, the audit manager 310 may employ a multi-level scoring model that identifies such relative importance of an anomaly. In some embodiments, such scoring model may be based on three levels of evaluation—recency (how recent did of the data anomaly occur), frequency (how frequent does the data anomaly occur), and tier (how critical/impactful is the issue).

However, in other embodiments, additional levels may be employed in order to achieve a more granular evaluation model, such as up to six levels.

In various embodiments, a numerical score may be given for each level, such as between 1 and 5. For example, a score of "1" for each level may indicate a data anomaly that is very recent, occurs frequently, and has high impact or other importance within the system, while a score "5" for each level may indicate that the anomaly was not recent, does not often occur, and is not of high importance or impact.

In some embodiments, the score for each level may have a relative ranking within the model. For example, recency may be given the highest ranking, followed by frequency given the second highest ranking, and tier given the lowest ranking. However, the relative rankings of each level may be adjusted or changed based on needs of the overall system and over time. Such relative rankings within the scoring model provide leverage for how to deal with various types of anomalies given various business considerations (i.e., whether to prioritize larger impact problems that occur with low frequency, etc.).

In various embodiments, the tier of the data anomaly may be based on how many metrics or the importance of the metrics impacted by the data anomaly.

In various embodiments, the recency, frequency, and tier of a data anomaly may be automatically assigned using advanced statistical functions. The results from the audit manager 310 employing the multi-level model may provide a measure of the relative criticality of addressing various issues.

Further, the audit manager 310 may apply the multi-level scoring model to a business rule or audit performance in addition to data anomalies in order to identify how well an issue is being evaluated.

In various embodiments, the results from the audit manager 310 may implicate different steps to take depending on what is being evaluated. For example, if evaluating a data quality anomaly, a suggested action may be provided for resolving the associated issue, whereas if evaluating a business rule, the suggested action may be provided for adjusting the rule.

Figure 4:
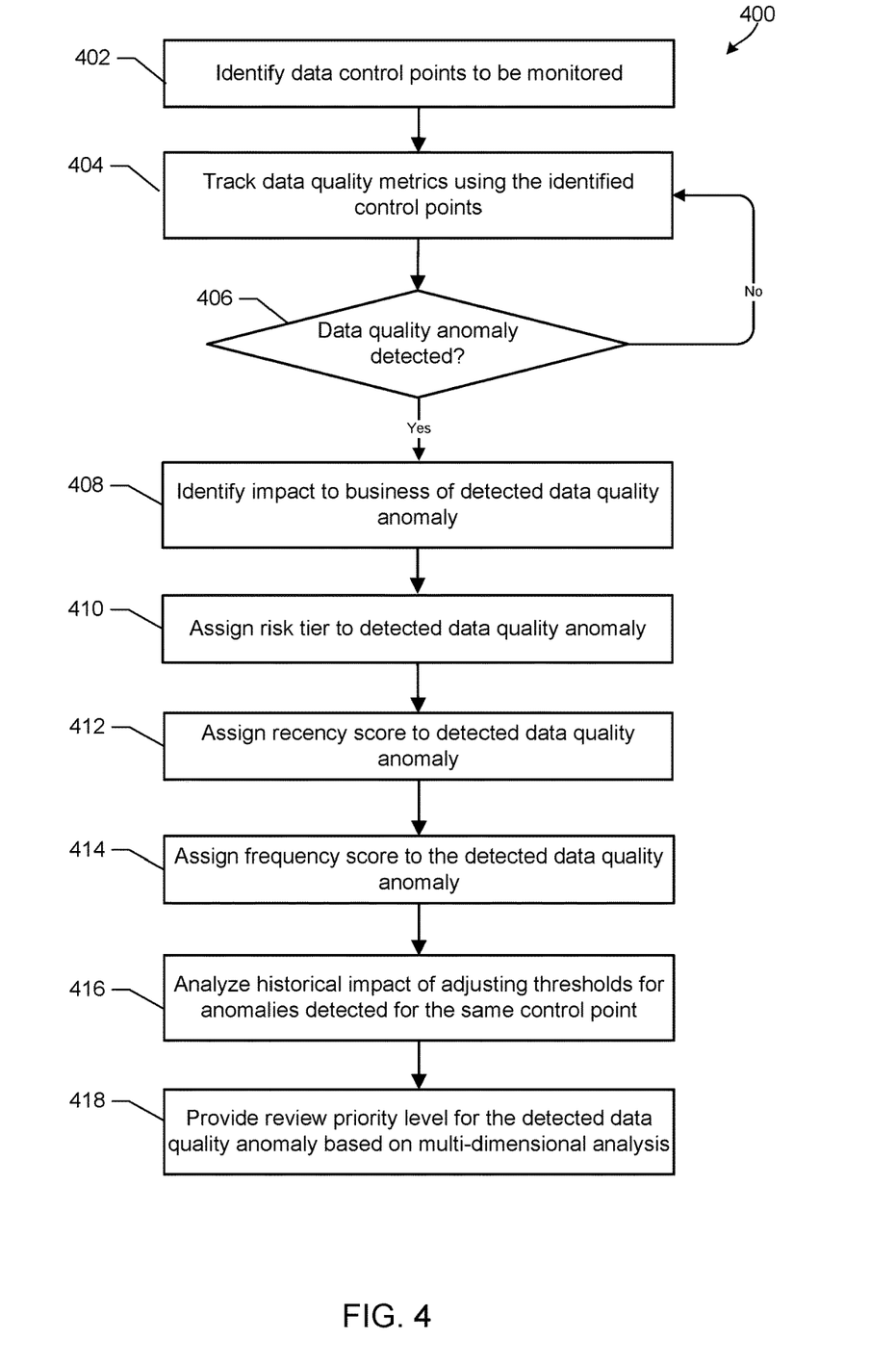
FIG. 4 is a process flow diagram illustrating a method for identifying and handling data quality anomalies according to various embodiments.

FIG. 4 is a process flow diagram illustrating a method 400 for identifying and tracking resolution of data quality anomalies according to various embodiments. With reference to FIGS. 1-4, the operations of the method 400 may be implemented in hardware components and/or software components of an enterprise computing (e.g., network computing device 110, 112, 114, 200) the operation of which may be controlled by one or more processors (e.g., the processor 201 and/or the like), referred to herein as a "processor." In various embodiments, the processor may be part of enterprise software used to manage a communication network by implementing the data integrity testing architecture 300.

In block 402, the processor may identify data control points to be monitored. Examples of such data control points for managing a communication network may include, for example, the number of internet customers online, a level of data traffic expected to be received from call centers, the number of service requests in a given area, etc. In various embodiments, these data control points may be input by a user as pre-determined control points for monitoring. In various embodiments, user input may also be used to enter criteria for monitoring the pre-determined control points, such as thresholds of deviation from an expected target.

In some embodiments, the processor may apply keyword recognition and/or NLP to customer communications in order to recommend and/or implement new control points. In some embodiments, additional control points may be added through use of general anomaly detection algorithms that find data points outside a normal range, and allows the business to review and add as additional control point if warranted.

In block 404, the processor may track data quality using the identified control points. For example, the processor may evaluate the various control points, and detect data anomalies as points that fall outside a preset threshold or deviation from normal range of a metric that is set for that control point.

In determination block 406, the processor may determine whether a data quality anomaly is detected. In response to determining that a data quality anomaly has not been detected (i.e., determination block 406="No"), the processor may continue to track data quality using the identified control points in block 404.

In response to determining that a data quality anomaly has been detected (i.e., determination block 406="Yes"), the processor may identify the impact to the business of the detected anomaly in block 408. In various embodiments, identifying the impact to the business may be based, for example, on user input to classify or otherwise provide analysis for a particular problem. Identifying the impact may also be automated based on natural language processing (NLP) applied to customer or other communications and/or feedback relating to the historical patterns/occurrences of problems for the associated control point. Further, identifying the impact may be supplemented based on the degree to which the metric being tracked misses the threshold set for the control point.

In block 410, the processor may assign a risk tier to the detected data quality anomaly. In various embodiments, the risk tier may be a score that provides a measure of how critical the issue is, including the degree of impact it has to other metrics and processes in the system. For example, the risk tier may be a numerical value from 1 to 5, with 1 being the highest criticality and 5 as the lowest, or vice versa. Such risk tier assignment may be based, for example, on the identified impact to the business from block 408, as well as a historical analysis of anomalies for the control point. In particular, in some embodiments, the processor may review historical data to pick out problems for the same control point, and determine an average rating of the risk based on natural language processing and any post mortem reviews of the problem.

In block 412, the processor may assign a recency score to the detected data quality anomaly. In various embodiments, the recency score may be based on how recently the data quality anomaly was detected, and/or how recently other problems occurred for the same control point, such as to a similar degree of exceeding the current threshold. In some embodiments, the recency score may be a numerical value from 1 to 5, with 1 being the most recent, and 5 as the least recent.

In block 414, the processor may assign a frequency score to the detected data quality anomaly. In various embodiments, the frequency score may be based on how frequently the data quality anomaly has been detected within a defined temporal limit, and/or how frequently other problems have occurred for the same control point over the defined temporal limit, such to a similar degree of exceeding the current threshold. In some embodiments, the frequency score may be a numerical value from 1 to 5, with 1 being the most frequent, and 5 as least frequent.

In block 416, the processor may analyze the historical impact of adjusting thresholds for anomalies detected for the same control point. For example, in various embodiments such analysis may be done by applying NLP to communications following adjustment to a threshold. Further, such analysis may involve determining the number of false positives, false negatives, and correct identification of problems from previous adjustments to the threshold for the control point to determine whether changing the thresholds by pre-configured amounts can reach a proper balance between false results and true problems.

In some embodiments, machine learning may be employed to adjust the thresholds. For example, if a particular threshold has been set at 2% for reporting an anomaly, the system may increase the threshold over time based on feedback indicating that a 2% problem rate for that variable is consistent and does not result in further issues. Further, machine learning may also be used to indicate that additional control points should be set. For example, based on semantic analysis and NLP of customer responses through call centers, the system may pick up on a problem that the existing data does not capture, and flag it as needing analysis.

In block 418, the processor may provide a review priority level for the detected data quality anomaly based on a multi-dimensional analysis. In various embodiments, the multi-dimensional analysis may be the multi-level model implemented by the audit manager. In particular the multi-dimensional analysis may be based on the risk tier, frequency, and recency scores assigned to the data anomaly.

In some embodiments, assigning the review priority level may cause a number of other systems and/or individual to handle the issue in any of a variety of ways. For example, a particular data quality anomaly may be reviewed, and result in system, data, or reporting changes, or modification to the control point or a business rule. Alternatively, review of the data quality anomaly may confirm that no further action or investigation is needed. In various embodiments, the weights of the various scores may be customized or modified to identify control points needing review for different reasons.

The systems and methods of the various embodiments may be implemented for a variety of different businesses. The following use cases pertaining to a provides telecommunications provider are provided merely as examples to illustrate how data anomalies may be identified and resolved through use of the various embodiments.

In a first example, a control point may be set to identify the number of new customers brought on in a particular geographic area over a period of time. A data anomaly may be detected when the number of new customers deviates from an expected range based on historical expectations and/or trends (i.e., a substantially higher number of new customers reported). Analysis according to the various embodiments may identify that the increase in customers correlated with a marketing campaign that had been initiated, and the data anomaly did not indicate a problem needing further investigation.

In a second example, a control point may be set to identify the number of set-top boxes reported as broken in a given area each day. A data anomaly may be detected when the number of reports deviates from an expected range based on historical expectations and/or trends (i.e., a higher number of set-top boxes reported as broken). The system may assign a review priority to the issue based on the recency, frequency, and risk tier (e.g., impact to the business and magnitude of the problem). Upon analyzing feedback from customers, the system according to various embodiments may increase the threshold for the control point if the increase relates to an issue in tracking versus an actual increase in broken set-top boxes.

In a third example, a control point may be set identify the number of trucks sent out to support customer service in a particular geographic area over a period of time. A data anomaly may be detected when the number of trucks sent out in the area deviate from an expected range based on the number of service requests (i.e., lower number of trucks sent out). The system may assign a review priority to the issue based on recency, frequency, and risk tier. Upon review, including the timing of historical occurrences of the same data anomaly (i.e., past instances when the number of trucks sent out in the area was lower than expected), the system may identify a pattern around bad weather. Upon further analysis, the business rule(s) around the control point may be expanded to include weather and road conditions.

Figure 5:
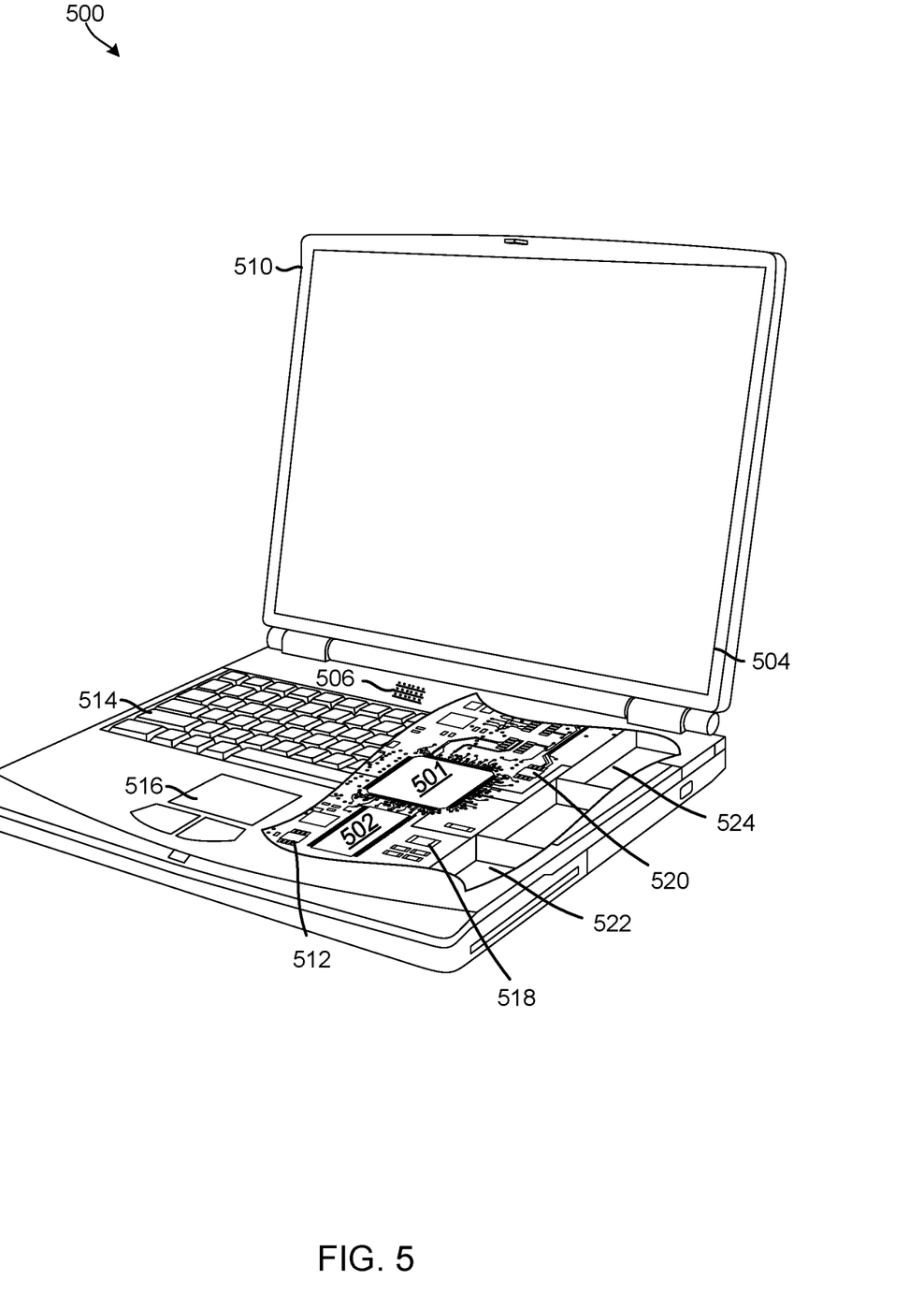
FIG. 5 is a system block diagram of a receiver device suitable for use with various embodiments.

FIG. 5 is a system block diagram of a mobile receiver device in the form of a laptop computer suitable for use with any of the embodiments. A typical laptop computer 500 may include a processor 501 coupled to an electronic display 504, a speaker 506, a volatile memory 502 and to a nonvolatile memory, such as a disk drive 522. The laptop computer 900 may also include a floppy disc drive, compact disc (CD) or DVD disc drive coupled to the processor 501. The laptop computer 500 may include an antenna 510, a multimedia receiver 512, a transceiver 518 and/or communications circuitry 520 coupled to the processor 501 for sending and receiving electromagnetic radiation, connecting to a wireless data link, and receiving IP and streaming multimedia services (e.g., audio-video streams, information flows, etc.). Additionally, the laptop computer 500 may include network access ports 524 coupled to the processor 501 for establishing data connections with a network (e.g., LAN coupled to a service provider network, etc.). A laptop computer 500 typically also includes a keyboard 514 and a mouse pad 516 for receiving user inputs.

The processors 201, 501 may be any programmable microprocessor, microcomputer or multiple processor chip or chips that can be configured by software instructions (applications) to perform a variety of functions, including the functions of the various embodiments described above. In some mobile receiver devices, multiple processors may be provided, such as one processor dedicated to wireless communication functions, one processor dedicated to video processing, and one processor dedicated to running other applications. Typically, software applications may be stored in the internal memory 202, 502, before they are accessed and loaded into the processor 202, 502. The processor 201, 501 may include internal memory sufficient to store the application software instructions.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for managing data quality anomalies in an enterprise system, the method comprising:
   accepting, by one or more network computing device, connections through data ingestion circuitry to receive a plurality of data sets for analysis in the enterprise system;
   generating, by the one or more network computing device, integrated data sets by executing natural language processing (NLP) tasks on at least one of ingested text and voice data in the data sets, wherein the NLP tasks implement one or more of statistical NLP and a Natural Language Toolkit (NLKT) library;
   identifying, by one or more network computing device implementing a data quality management (DQM) framework, control points for monitoring the integrated data sets in the enterprise system;
   tracking, by the one or more network computing device, data quality metrics using at least one threshold for each of the identified control points;
   determining, by the one or more network computing device, whether a data quality anomaly is detected;
   classifying, by the one or more network computing device, a review priority in response to determining that a data quality anomaly is detected;
   analyzing, by the one or more network computing device, feedback for one of the identified control points associated with the detected data quality anomaly to identify additional problems impacting business; and
   in response to identifying additional problems impacting business:
      automatically adjusting, by the at least one network computing device, the at least one threshold for the one of the identified control points associated with the detected data quality anomaly to capture the identified additional problems, wherein the automatically adjusting is performed using machine learning; and
      feeding, by the at least one network computing device, the adjusted at least one threshold back to track the data quality metrics for the one of the identified control points.

2. The method of claim 1, wherein classifying a review priority comprises:
   identifying, by the at least one network computing device, a business impact of the detected data quality anomaly.

3. The method of claim 2, further comprising:
   adjusting, by the at least one network computing device, the identified business impact of the detected data quality anomaly,
   wherein adjusting the identified business impact is based on a degree of deviation from the at least one threshold for an identified control point associated with the detected data quality anomaly.

4. The method of claim 1, further comprising:
   automatically adjusting, by the at least one network computing device, the at least one threshold for an identified control point associated with the detected data quality anomaly based at least in part on historical false positive alerts for the identified control point associated with the detected data quality anomaly.

5. The method of claim 1, further comprising in response to determining that a data quality anomaly is detected:
   performing, by the at least one network computing device, a multi-dimensional analysis on the detected data quality anomaly.

6. The method of claim 5, wherein performing a multi-dimensional analysis on the detected data quality anomaly is based on:
    a risk tier assigned to the detected data quality anomaly;
    a recency score assigned to the detected data quality anomaly; and
    a frequency score assigned to the detected data quality anomaly.

7. The method of claim 6, wherein the frequency score is based at least in part on historical trends in anomalies for an identified control point associated with the detected data quality anomaly.

8. The method of claim 6, wherein the recency score is based at least in part on temporal proximity of historical anomalies for an identified control point associated with the detected data quality anomaly.

9. The method of claim 6, wherein the risk tier is based at least in part on cognitive analysis of feedback responding to historical anomalies for an identified control point associated with the detected data quality anomaly.

10. The method of claim 1, wherein classifying the review priority further comprises:
    analyzing a historical impact of adjusting thresholds for an identified control point associated with the detected data quality anomaly.

11. The method of claim 1, further comprising in response to determining that a data quality anomaly is detected:
    determining, by the at least one network computing device, a cost associated with the detected data quality anomaly.

12. The method of claim 1, further comprising, in response to determining that a data quality anomaly is detected:
    determining, by the at least one network computing device, whether and how the detected data quality anomaly should be resolved based at least in part on the review priority.

13. A computing device comprising:
    a processor implementing a data quality management (DQM) framework, wherein the processor is configured with processor-executable instructions to perform operations comprising:
        accepting connections via data ingestion circuitry to receive a plurality of data sets for analysis in an enterprise system;
        generating integrated data sets by executing natural language processing (NLP) tasks on at least one of ingested text and voice data in the data sets, wherein the NLP tasks implement one or more of statistical NLP and a Natural Language Toolkit (NLKT) library;
        identifying control points for monitoring the integrated data sets in the enterprise system;
        tracking data quality metrics using at least one threshold for each of the identified control points;
        determining whether a data quality anomaly is detected;
        classifying a review priority in response to determining that a data quality anomaly is detected;
        analyzing feedback for one of the identified control points associated with the detected data quality anomaly to identify additional problems impacting business; and
        in response to identifying additional problems impacting business:
            automatically adjusting the at least one threshold for the one of the identified control points associated with the detected data quality anomaly to capture the identified additional problems, wherein the automatically adjusting is performed using machine learning; and
            feeding the adjusted at least one threshold back to track the data quality metrics for the one of the identified control points.

14. The computing device of claim 13, wherein the processor is configured with processor-executable instructions to perform operations such that classifying a review priority comprises:
    identifying a business impact of the detected data quality anomaly.

15. The computing device of claim 14, wherein the processor is configured with processor-executable instructions to perform operations further comprising:
    adjusting the identified business impact of the detected data quality anomaly,
    wherein adjusting the identified business impact is based on a degree of deviation from the at least one threshold for an identified control point associated with the detected data quality anomaly.

16. The computing device of claim 13, wherein the processor is configured with processor-executable instructions to perform operations further comprising:
    automatically adjusting the at least one threshold for an identified control point associated with the detected data quality anomaly based at least in part on historical false positive alerts for the identified control point associated with the detected data quality anomaly.

17. The computing device of claim 13, wherein the processor is configured with processor-executable instructions to perform operations further comprising:
    performing a multi-dimensional analysis on the detected data quality anomaly in response to determining that a data quality anomaly is detected.

18. The computing device of claim 17, wherein the processor is configured with processor-executable instructions to perform operations such that performing a multi-dimensional analysis on the detected data quality anomaly is based on:
    a risk tier assigned to the detected data quality anomaly;
    a recency score assigned to the detected data quality anomaly; and
    a frequency score assigned to the detected data quality anomaly.

19. The computing device of claim 18, wherein the frequency score is based at least in part on historical trends in anomalies for an identified control point associated with the detected data quality anomaly.

20. The computing device of claim 18, wherein the recency score is based at least in part on temporal proximity of historical anomalies for an identified control point associated with the detected data quality anomaly.

21. The computing device of claim 18, wherein the risk tier is based at least in part on cognitive analysis of feedback responding to historical anomalies for an identified control point associated with the detected data quality anomaly.

22. The computing device of claim 13, wherein the processor is configured with processor-executable instructions to perform operations such classifying the review priority further comprises:
    analyzing a historical impact of adjusting thresholds for an identified control point associated with the detected data quality anomaly.

23. The computing device of claim 13, wherein the processor is configured with processor-executable instructions to perform operations further comprising:
  determining a cost associated with the detected data quality anomaly in response to determining that a data quality anomaly is detected.

24. The computing device of claim 13, wherein the processor is configured with processor-executable instructions to perform operations further comprising:
  determining whether and how the detected data quality anomaly should be resolved based at least in part on the review priority in response to determining that a data quality anomaly is detected.

25. A non-transitory processor readable medium having processor executable instructions stored thereon configured to cause a processor implementing a data quality management (DQM) framework to perform operations comprising:
  accepting connections via data ingestion circuitry to receive a plurality of data sets for analysis in an enterprise system;
  generating integrated data sets by executing natural language processing (NLP) tasks on at least one of ingested text and voice data in the data sets, wherein the NLP tasks implement one or more of statistical NLP and a Natural Language Toolkit (NLKT) library;
  identifying control points for monitoring the integrated data sets in the enterprise system;
  tracking data quality metrics using at least one threshold for each of the identified control points;
  determining whether a data quality anomaly is detected;
  classifying a review priority in response to determining that a data quality anomaly is detected;
  analyzing feedback for one of the identified control points associated with the detected data quality anomaly to identify additional problems impacting business; and
  in response to identifying additional problems impacting business:
    automatically adjusting the at least one threshold for the one of the identified control points associated with the detected data quality anomaly to capture the identified additional problems, wherein the automatically adjusting is performed using machine learning; and
    feeding, by the at least one network computing device, the adjusted at least one threshold back to track the data quality metrics for the one of the identified control points.

26. The non-transitory processor readable medium of claim 25, wherein the processor executable instructions are configured to cause a processor to perform operations such that classifying a review priority comprises identifying a business impact of the detected data quality anomaly.

* * * * *